Aug. 12, 1941.  A. SCHWARZ  2,252,416
TORQUE CONTROLLED MECHANISM
Filed July 23, 1940  2 Sheets-Sheet 1
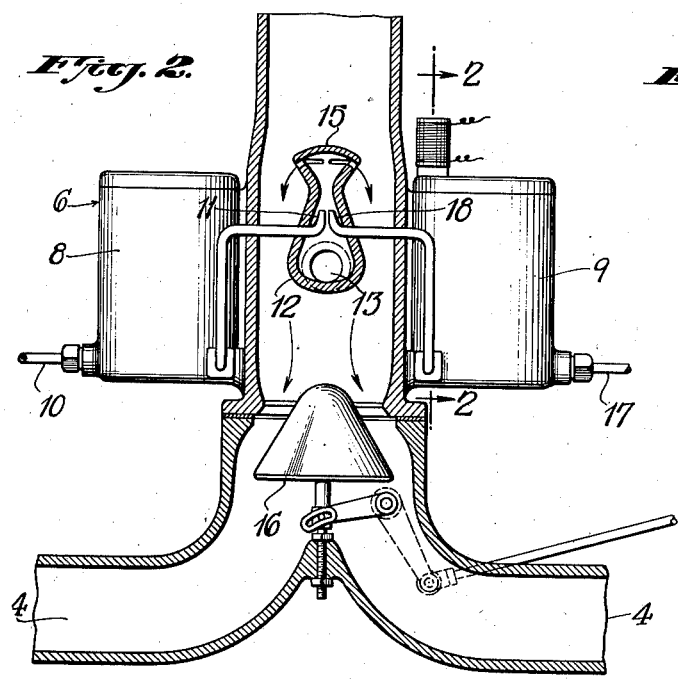
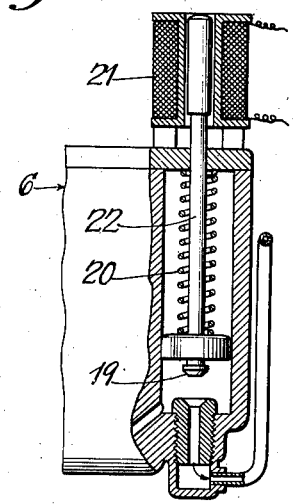
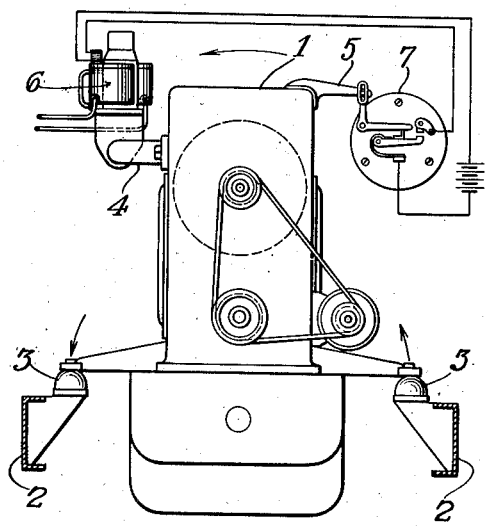
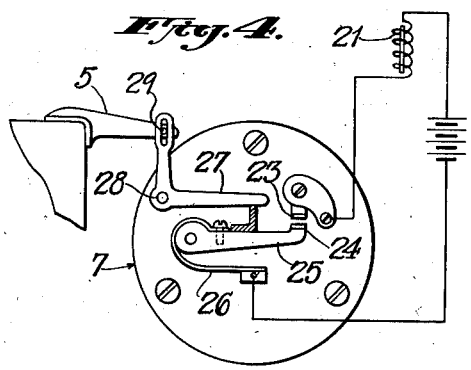
INVENTOR.
ALFRED SCHWARZ
BY Ward Crosby & Ned
his ATTORNEYS Aug. 12, 1941.   A. SCHWARZ   2,252,416
TORQUE CONTROLLED MECHANISM
Filed July 23, 1940   2 Sheets-Sheet 2
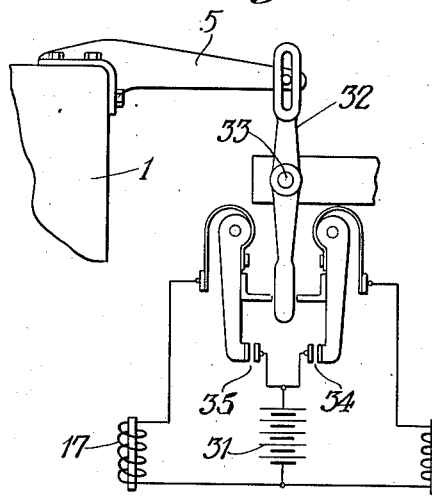
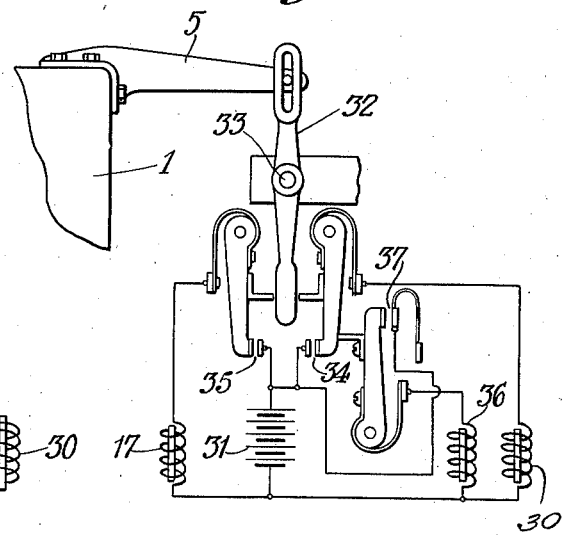
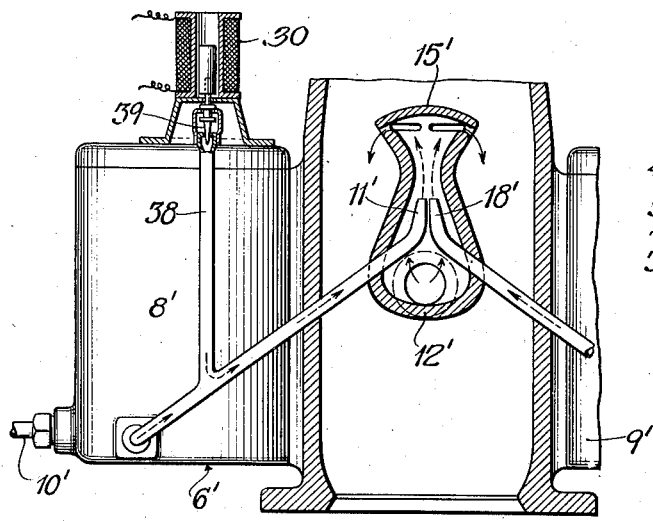
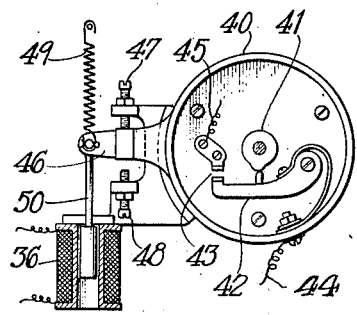
INVENTOR.
ALFRED SCHWARZ.
BY
his ATTORNEYS Patented Aug. 12, 1941

2,252,416

UNITED STATES PATENT OFFICE 2,252,416

TORQUE CONTROLLED MECHANISM

Alfred Schwarz, Ridgewood, N. J., assignor to Automotive Economy Corporation, Jersey City, N. J., a corporation of Delaware Application July 23, 1940, Serial No. 346,901

10 Claims. (Cl. 123—127)

The invention relates to a torque controlled mechanism. While the invention is useful for other purposes, it has been successfully utilized in connection with and will be described with reference to its embodiment in an automotive vehicle, as a ready means of illustrating the scope of its potential usefulness. More specifically, the invention relates to means for automatically controlling the actuation of engines by and in accordance with varying torque conditions.

In the operation of motive means, it is desired to change the operation characteristics in accordance with certain operative conditions. For instance, in an internal combustion engine the retarding of the spark or the injection of an antiknock substance are known to suppress detonation when certain load conditions are imposed, as for example in propelling an automotive vehicle. Likewise, when the load, such as the vehicle, tends to overrun or overdrive the engine and a reverse torque is imposed on the engine, another condition exists which makes it desirable to alter the operation of the engine. Heretofore, the variation in pressure in the intake has been utilized for introducing antiknock substances; and in my copending applications Ser. No. 259,803, filed March 4, 1939, and Ser. No. 259,806, filed March 4, 1939, I have disclosed means for introducing antiknock substances in accordance with the throttle position and speed of engine rotation. Likewise, the speed of engine rotation has been utilized for varying the ignition timing.

I have found that in addition to the speed of engine rotation and throttle position, the manner and degree of torque imposed on the engine is another variation by which the necessity may be determined for changing the operation characteristics of the engine, and I have discovered how this phenomenon may be advantageously utilized for such control.

An object of the invention is the utilization of the torque imposed by and upon the motive means to automatically vary the operative conditions of the motive means.

Another object of the invention is the provision of apparatus which is controlled by and in accordance with the torque characteristics for automatically admitting an antiknock agent, adjusting the spark, and varying the normal fuel supply, or one or more of these adjustments.

Further objects and advantages of the invention will more fully appear from the following description taken in connection with the accompanying drawings which show, by way of example, the present preferred embodiment of the invention.

The invention consists in the novel features, arrangements, and combination of parts embodied by way of example in the apparatus hereinafter described as illustrating the preferred form of the invention, and the invention will be more particularly pointed out in the appended claims.

In the drawings:

Fig. 1 is a front view of an engine, diagrammatically showing one application of the invention as applied to a dual fuel carburetor;

Fig. 2 is a side elevational view, partially in cross section, showing the dual fuel carburetor of Fig. 1;

Fig. 3 is a cross section of the carburetor taken at 2—2 of Fig. 2, and showing further details thereof;

Fig. 4 is a front view of the torque control feature of the invention;

Fig. 5 is a modified arrangement of the torque control feature;

Fig. 6 is still another modification of the torque control;

Fig. 7 is a side elevation partly in section showing certain modifications of the dual fuel carburetor shown in Fig. 2, and Fig. 8 is a plan view of an adjustable ignition timing device.

Referring in particular to Fig. 1: the invention is shown as applied to a conventional automotive power device in which the engine is designated in its entirety as 1, and is resiliently mounted to the framework 2 by means of a number of rubber cushions 3 in a manner well known in the art.

An engine, which is thus resiliently mounted and which is operating under a substantial torque, will tend to rotate axially about its power shaft and, due to the resiliency of the mountings, will rock to one side or the other depending upon the direction of the torque. Thus an engine, whose power shaft is rotated in a clockwise direction, will tend to rock counter-clockwise when under substantial load torque, and vice versa the same engine will tend to rock clockwise when reacting to a torque exerted in the opposite direction, such for instance, as when the engine is exerting a braking effect upon the object being driven. Not only is the rocking direction of the engine determined by the type of torque exerted, but also the degree of rocking is substantially proportionate to the degree of torque. Therefore, since the rocking movement of any engine at any time bears a direct relationship to the direction and degree of torque being exerted; and since the degree of movement can be predetermined for any given torque, the position of the engine may be dependably used as an index or control for automatically determining and conditioning the explosive charge in accordance with varying torque requirements.

The explosive charge enters the engine through the intake manifold 4. During operation the engine crankshaft is rotated in a clockwise direction (as viewed in Fig. 1), so that when operating under a driving torque the engine rocks counter-clockwise, as indicated by the direction of the arrows, to a degree commensurate with the driving torque. This rocking motion of the engine 1 is transmitted by suitable means such as an arm 5 to a torque responsive mechanism for controlling the operative conditions of the engine in the manner to be more particularly pointed out following. The carburetor for mixing the explosive charge of fuels is designated in its entirety as 6 and is shown partly in section in Fig. 2. Torque responsive means in the present embodiment takes the form of an electrical breaker assembly 7 for controlling the automatic adjustment of the engine in the manner to be described following.

Referring to Fig. 2, the carburetor 6 is of the dual fuel type having separate fuel chambers 8 and 9 for dispensing respectively a base fuel and an auxiliary fuel. The base fuel is supplied to the chamber 8 through the fuel line 10, and is dispensed therefrom through the jet 11, disposed within the interior of the Venturi tube 12, where it is sprayed out into a vaporizing stream of warm air entering the venturi through the opening 13, impinges against the deflector plate 15, then enters and mixes with the down draft or main supply of air, as indicated by the arrows, to form the explosive charge which passes around the throttle valve 16 and into the engine intake 4. The auxiliary fuel, such as alcohol, or other antiknock agent, is supplied to the chamber 9 through the fuel line 17 and is fed into the venturi through the jet 18 from whence it is intimately mixed and vaporized along with the base fuel. The feeding of the auxiliary fuel to the jet 18 is, however, regulated by a valve designated in its entirety as 19 (Fig. 3), which valve is normally held in closed position by the spring 20, and is only allowed to open during periods in which the solenoid 21 is activated to raise the valve stem 22. These feeding periods during which the solenoid is activated are adjustably controlled so as to coincide with the periods during which the engine tends to detonate. The control means for activating the solenoid 21 comprises the torque responsive means 7 (Fig. 1) shown in further detail in Fig. 4 in which the solenoid 21 is diagrammatically shown. The electric circuit through the solenoid is opened and closed by contact points 23 and 24, the first of which is stationary while the second is relatively movable towards and away from the first and is mounted on a breaker arm 25. The arm 25 illustrated is the usual ignition breaker arm having an insulating bushing on which it is pivotally mounted and being provided with the usual rubbing block and normally urged to closed position by a spring 26, which tends to bring the contacts together for closing the circuit. However, as shown in Figs. 1 and 4, a bell crank 27 is pivotally mounted at 28 on a relatively fixed part such as the assembly 7, and one arm thereof carries a slot engaged by a pin fixed to the arm 5 to thereby provide a lost motion connection 29 between the lever arm 5 and bell crank 27. The other arm of the bell crank 27 bears against the rubbing block of the movable breaker arm 25, so that when the arm is pivoted in a clockwise direction it acts as a cam to force the contacts 23—24 apart and open the circuit. It will thus be seen that as the engine 1 is rocked under torque, the auxiliary fuel is admitted.

Referring to Fig. 5, a modified breaker assembly is disclosed which operates in much the same way as that just described, except in this modification there are two sets of breaker contacts 34 and 35, each for alternately activating one of two solenoids, such as the solenoid 17 and an additional solenoid 30 connected in circuit with a suitable source of electrical energy such as a battery 31. Instead of the bell crank 27, there is a walking beam 32 pivoted to a stationary portion of the assembly at 33, so that a counter-clockwise movement of the engine 1 will swing the arm 32 counter-clockwise, closing the circuit through the contacts 35 to activate the solenoid 17, while at the same time the circuit through the solenoid 30 is opened by the points 34 being forced apart.

Fig. 6 discloses still another modification which is adapted to control three solenoids such as the solenoids 17, 30 and 36, instead of two. This mechanism is identical with that previously described for activating the two solenoids 17 and 30 which, along with their respective breaker points, are designated by the same numerals as in Fig. 5. A third solenoid 36, however, is controlled by the breaker points 37 which are closed upon an extensive opening of the points 34, and this solenoid is utilized in the present embodiment for adjusting the ignition timing; as will be more particularly described following.

Fig. 7 in general discloses a dual fuel carburetor similar to that previously described in connection with Fig. 2 and corresponding prime numerals will be applied to similar parts, and only the differences in structure will now be more particularly pointed out. The jet 11' is inclined upwardly from the regular fuel chamber 8' and is provided with an air bleeder tube 38 which carries at its upper end a suitable valve 39 which is normally in closed position and is adapted to be opened by suitable means such as the electrical solenoid 30, as clearly indicated. Accordingly, the flow of regular fuel through the carburetor 6' may be decreased by venting the feed line to jet 11' by means of the valve 39 through energization of the solenoid 30.

Fig. 8 discloses a more or less conventional ignition timing device 40, from which the usual cap has been removed in order to disclose the interior. The construction and arrangement of the timing cam 41, breaker arm 42 and co-operating contact points 43 are well understood by those skilled in the art and need not be further described. A movable contact is connected to one side of the ignition circuit as by a wire 44 and the fixed contact is connected to the other side of the ignition circuit by a wire 45. The housing 40 is pivotally supported for limited rotation and adjustment by means of an arm 46, whose movement is limited by suitable adjustable stop screws 47—48. The arm is normally held in advanced position by a spring 49 and is adapted to be moved in retarded position against the force of the spring by a solenoid rod 50 connected at its lower end to the armature of a solenoid such as the solenoid 36 previously referred to in connection with Fig. 6.

The invention having been described with reference to the construction of the various parts thereof, a detailed description of the operation of the invention will now be given. For the sake of simplicity the single control type, such as depicted in Figs. 1 through 4, will be described first.

The installation shown in Fig. 1 is so arranged as to feed alcohol whenever the load or driving torque of the engine is either equal to or greater than the degree at which the base fuel commences to detonate. The breaker assembly 7 is mounted upon a stationary portion, such for example as the engine compartment bulkhead of an automotive vehicle. The lever arm 5 is so fastened to the engine that the extremity of the lever is positioned adjacent and connected to the breaker assembly through the lost motion connection 29. When thus arranged, the counter-clockwise rocking movement of the engine will cause the lever 5 and the bell crank or cam arm 27 to move in a like direction, allowing the spring 26 to move the breaker arm counterclockwise also. If the load torque exerted on the engine is of such a degree as to move the cam far enough, the breaker point 24 will contact with the point 23 to close the circuit through the solenoid 21. This contact point 23, while normally stationary, may be adjusted towards and away from the movable point 24. A proper adjustment of the space between these contact points can be made so that the degree of movement necessary for them to make contact with each other will coincide with the degree of torque-induced movement in the engine at the time that detonation is about to commence. Thus, before the critical degree of torque is attained, the solenoid is energized. This lifts the valve stem 22 (Fig. 3) and opens the alcohol valve 19 which remains open as long as the load torque is sufficient to hold the cam 27 away from the rubbing block of breaker arm 25. As the torque is reduced below the critical degree, the cam arm forces the breaker contacts apart opening the circuit so as to allow the spring 20 to close the valve 19 and terminate the feed of alcohol.

The same adjustment between the engine and the assembly 7 of Fig. 4 may be utilized to energize individually the solenoid 36 of Fig. 6 so that the ignition is automatically retarded and advanced according to torque conditions.

The breaker assembly modification depicted in Fig. 5 not only controls the feeding of alcohol, but also the feeding of air into the base fuel jet line 11' of Fig. 7. In this modification the set of contact points 32 are adjusted and function in an identical manner as the points 23—24 of Fig. 4. That is to say, a critical degree of load torque will cause them to close the circuit through the solenoid 17 to commence feeding auxiliary fuel. The second set of points 34, however, is located on the other side of the walking beam 32 for energizing the solenoid 30 of Fig. 6. As already pointed out, economy can be promoted by leaning the supply of base fuel whenever there is a reverse torque acting upon the engine. Such a reverse torque will tend to rock the engine clockwise and, through lever arm 5, to move the beam 32 clockwise so as to allow the set of points 34 to close and energize the solenoid 30 of Fig. 7. This opens the air valve 39 and permits the bleeding of air into the base fuel jet 11'. The points 34 should be adjusted to close as soon as there is a substantial reverse torque.

The invention, of course, is not to be construed as limited to the specific adaptation shown by way of example in the drawings, but is to extend in scope so as to broadly cover the method of automatically conditioning an engine by means of apparatus so adjusted as to be actuated during certain periods as a result of a predetermined degree and direction of torque.

Having thus described my invention with particularity with reference to the preferred embodiment of the same, it will be obvious to those skilled in the art, after understanding my invention, that changes and modifications may be made therein without departing from the spirit and scope of the invention, and I aim in the appended claims to cover such changes and modifications as are within the scope of the invention.

What I claim is:

1. In combination, motive means, mounting means for said motive means, said motive means and said mounting means being so constructed and arranged that upon operation said motive means has a definite movement on said mounting means when a substantial torque load is present, said motive means having a fuel supply device constructed and arranged so as to mix a base fuel and an auxiliary fuel, means for controlling the supply of auxiliary fuel to said mixing device, and means actuated by the movement of said motive means for operating said control means.

2. In combination, motive means, mounting means for said motive means, said motive means and said mounting means being so constructed and arranged that upon operation said motive means has a definite movement on said mounting means when a substantial torque load is present, said motive means having a fuel supply device comprising a first jet for introducing a base fuel and a second jet for introducing an auxiliary fuel, means for controlling the supply of auxiliary fuel to said second jet, and means actuated by the movement of said motive means for operating said control means.

3. In an automotive vehicle, the combination of an internal combustion engine, resilient means for supporting said engine so as to permit relative movement between said engine and a relatively rigid portion of said vehicle under variations in engine torque, control means secured to said relatively rigid vehicle portion, means serving to actuate said control means upon said torque induced engine movement, and means for feeding an antiknock agent into the intake system of said engine, said last means being actuated by said control means for supplying said antiknock agent to said engine in accordance with said torque variations.

4. In an automotive vehicle, the combination of an internal combustion engine, resilient means for supporting said engine so as to permit relative movement between said engine and a relatively rigid portion of said vehicle under variations in engine torque, control means so constructed and arranged that it is actuated by said torque induced engine movement, and means for feeding an antiknock agent into the intake system of said engine, said last means being actuated by said control means for supplying said agent to said engine in accordance with said torque variations.

5. An automatic torque controlled power device comprising, an internal combustion engine for producing a variable driving torque and having a fuel supply device so constructed and arranged as to mix a base fuel and an auxiliary fuel, resilient means for mounting said engine on a body frame with respect to which it is relatively movable, the construction and arrangement of said engine and resilient means being such that a rocking movement is imparted to the engine upon the operation of the engine under sufficient load to create a substantial driving torque, fuel control mechanism comprising torque responsive means actuated by the rocking movement of the engine, and means selectively controlled by said mechanism for admitting an auxiliary fuel to the engine when under relatively high driving torque.

6. An automatic torque controlled power device comprising, an internal combustion engine for producing a variable driving torque and having a fuel supply device so constructed and arranged as to mix a base fuel and an auxiliary fuel, resilient means for mounting said engine on a body frame with respect to which it is relatively movable, the construction and arrangement of said engine and resilient means being such that a rocking movement is imparted to the engine upon the operation of the engine under sufficient load to create a substantial driving torque, driving means for normally delivering power from the device, means for transmitting driving torque from the engine when under load to the driving means and transmitting a reverse torque to the engine when it is being driven by the driving means, fuel control mechanism comprising torque responsive means actuated by the rocking movement of the engine, means selectively controlled by said mechanism for admitting an auxiliary fuel to the engine when under relatively high driving torque, and additional means selectively controlled by said torque responsive means for decreasing the normal supply of base fuel to the engine when under a substantial reverse torque.

7. An automatic torque controlled power device comprising, an internal combustion engine for producing a variable driving torque and having a fuel supply device so constructed and arranged as to mix a base fuel and an auxiliary fuel, resilient means for mounting said engine on a body frame with respect to which it is relatively movable, the construction and arrangement of said engine and resilient means being such that a rocking movement is imparted to the engine upon the operation of the engine under sufficient load to create a substantial driving torque, fuel and ignition control mechanism comprising torque responsive means actuated by the rocking movement of the engine, means selectively controlled by said mechanism for admitting an auxiliary fuel to the engine when under relatively high driving torque, additional means selectively controlled by said mechanism for admitting an additional supply of base fuel and retarding the ignition of the engine when under a relatively higher torque.

8. An automatic torque controlled power device comprising, an internal combustion engine producing a variable driving torque and having a fuel supply device so constructed and arranged as to mix a base fuel and an auxiliary fuel, resilient means for mounting said engine on a body frame with respect to which it is relatively movable, the construction and arrangement of said engine and resilient means being such that a rocking movement is imparted to the engine upon the operation of the engine under sufficient load to create a substantial driving torque, fuel control mechanism comprising torque responsive means actuated by the rocking movement of the engine, means selectively controlled by said mechanism for admitting an auxiliary fuel to the engine when under relatively high driving torque, and additional means selectively controlled by said torque responsive means for admitting an additional supply of base fuel to the engine when under relatively higher driving torque.

9. An automatic torque controlled power device comprising, an internal combustion engine for producing a variable driving torque and having a fuel supply device so constructed and arranged as to mix a base fuel and an auxiliary fuel, resilient means for mounting said engine on a body frame with respect to which it is relatively movable, the construction and arrangement of said engine and resilient means being such that a rocking movement is imparted to the engine upon the operation of the engine under sufficient load to create a substantial driving torque, fuel and ignition control mechanism comprising torque responsive means actuated by the rocking movement of the engine, means selectively controlled by said mechanism for admitting an auxiliary fuel to the engine when under relatively high driving torque, and additional means selectively controlled by said torque responsive means for retarding the ignition of the engine when under a relatively higher torque.

10. An automatic torque controlled power device comprising, an internal combustion engine for producing a variable driving torque, resilient means for mounting said engine on a body frame with respect to which it is relatively movable, the construction and arrangement of said engine and resilient means being such that a rocking movement is imparted to the engine upon the operation of the engine under sufficient load to create a substantial driving torque, and torque controlled means actuated by said rocking movement for selectively actuating an ignition timing mechanism, said means being so constructed and arranged that the timing mechanism is advanced by a low torque and retarded by a relatively high torque.

ALFRED SCHWARZ.